United States Patent Office 3,402,136
Patented Sept. 17, 1968

3,402,136
INTRODUCTION OF POLAR GROUPS INTO
UNSATURATED POLYMERS OF DIENES
Taketami Sakuragi, Tokyo, Osao Baba, Yokohama, and Shinichi Akiyama, Tokyo, Japan, assignors to The Japanese Geon Company, Ltd., Chiyoda-ku, Tokyo, Japan, a corporation of Japan
No Drawing. Filed June 21, 1965, Ser. No. 465,779
Claims priority, application Japan, July 1, 1964, 39/36,957; Nov. 16, 1964, 39/64,337
14 Claims. (Cl. 260—23.7)

ABSTRACT OF THE DISCLOSURE

A method of modifying an unsaturated high molecular weight diene-containing substance and the products produced thereby wherein such process comprises reacting such high molecular weight substance with (1) a carboxylic acid, an alcohol, a phenol or a mixture thereof, and (2) an alkyl hypohalite, in a solvent which is inert in the reaction system. The products are valuable as industrial materials or intermediates.

---

This invention relates to a method of producing new high molecular weight substances by introducing various substituent radicals to the unsaturated bonds of unsaturated, high molecular weight substances. More particuarly, the invention relates to a method of producing elastomers—elastomers having resinlike properties or resinlike substances—by reacting unsaturated, high molecular weight substances, say elastomers, with either an organic acid, a phenol or an alcohol, using an alkyl hypohalite as an assistant.

The so-called carboxylated rubber, i.e., an elastomer having a free carboxyl radical, is superior in such as, say, adhesiveness and strength of the vulcanized product, as compared with those which do not possess these functional radicals. Further, it is a valuable industrial material for such reasons as that it can be utilized for curers and other special uses which depend upon the reactivity of the carboxyl radical.

As a method of introducing carboxyl radicals to synthetic elastomers, known is a method wherein this is accomplished by copolymerizing the elastomers with unsaturated carboxylic acids, for example, acrylic acid. The cases where this method can actually be practiced are very limited however in view of the character of the monomeric material to be copolymerized or that of the polymerization catalyst. Another known method comprises treating with carbon dioxide the polybutadiene dilithium compound obtained in the final stages of the polymerization as in the case when butadiene is polymerized using as catalyst an alkylated alkali metal, say butyl lithium, to obtain a carboxylated compound via the dilithium salt of a polybutadiene dicarboxylic acid. In this method however, the number of carboxyl radicals that can be introduced is limited to two per each molecule of the polybutadiene. Further, not only is a limitation imposed in the point that the carboxyl radicals can only be introduced to the ends of the polybutadiene molecule, but also that the substances that can be carboxylated are limited to only those which are polymerizable by means of the alkylated alkali metals. Further, as a typical method of introducing free carboxyl radicals by means of the post-treatment of the elastomer, there is a method of reacting the elastomer and thioglycolic acid radically, but this method inevitably gives rise to the depolymerization of the elastomer molecules. In addition, the rearrangement reaction of the steric structure, i.e., the cis-trans, is pronounced. For instance, when cis-1,4-polybutadiene is treated at 40° C. in accordance with this reaction, using N,N'-azobisisobutyronitrile as catalyst, it is confirmed by experiments that the cis bonds practically all disappear, a major part becoming trans bonds, and moreover a pronounced decrease in the molecular weight is brought about.

Again, generally as a method of modifying the diene polymers to impart desirable properties to them, it is known to copolymerize the monomeric dienes with the monomeric vinyls. Typical are, e.g., the butadiene-styrene copolymers, butadiene-acrylonitrile copolymers, butadiene-styrene-vinylpyridine copolymers, butadine-acrylonitrile-acrylic acid copolymers and butadiene-styrene-acrylonitrile copolymers. However, since in the modifications of the diene polymers by means these copolymerization methods the primary condition is that the monomeric vinyls are copolymerizable with the material dienes, naturally the class of monomeric vinyls that can be chosen as the copolymerization material becomes limited. For example, it is exceedingly difficult to copolymerize butadiene with vinyl chloride and vinyl acetate, the most universal of the monomeric vinyls, so long as the presently established polymerization techniques are used.

It is an object of the present invention to provide a method of modifying the unsaturated, high molecular weight substances without the accompaniment of the hereinabove noted limitations and difficulties.

Other objects of the invention will be apparent from the following description.

These objects of the present invention are achieved by carrying out the reaction between an unsaturated, high molecular weight substance having as one of its constituents a diene, such as natural rubber, polybutadiene, polyisoprene, the butadiene-styrene copolymers, the butadiene-acrylonitrile copolymers, the ethylene-propylene-diene copolymers, the isobutylene-diene copolymers and polychloroprene, at least one substituent radical introducing substance selected from the group consisting of the organic acids containing at least one free carboxyl radical, the alcohols and phenols containing at least one free hydroxyl radical, and hydroxy acids containing at least one free carboxyl radical and at least one free hydroxyl radical, and an alkyl hypohalite.

When the unsaturated, high molecular weight substance, the substituent radical introducing substance and the alkyl hypohalite are reacted in accordance with this invention method, a modified product which approximately or substantially corresponds structurally with a copolymer having monomeric dienes, monomeric vinyl halides and other monomeric vinyls as constituents is obtained, the properties of which are different from the starting material unsaturated, high molecular weight substance. Furthermore, when by carrying out this reaction partially (incompletely) a part of the unsaturated bonds are caused to remain in the reaction product, that in this case the steric structure of the product is essentially identical to that of the unsaturated bonds in the starting material, or in other words, that the cis-trans rearrangement reaction of the remaining unsaturated bonds does not take place, is one of the features of this invention.

The chemical reactions that are set up in the invention method and the chemical structure of the resulting reaction product can be determined from the results of the usual chemical analyses such as elemental analysis and an analysis of the unsaturated bonds, instrumental analyses such as infrared and ultraviolet spectrum analysis and on the basis of present day knowledge concerning organic chemical reactions. Take, for example, the case where 1,4-polybutadiene is used as the starting material unsaturated, high molecular weight substance and it is reacted with an organic acid or a phenol or an alcohol compound (indicated as ROH) in the presence of tertiary butyl hypochlorite, the mechanism of the principal reactions considered to be most pertinent and the structures of the reaction products are as below indicated.

tions the starting material unsaturated, high molecular weight substance with either an organic acid containing at least one free carboxyl radical, or a phenol or an alcohol containing at least one free hydroxyl radical, or a hydroxy acid containing at least one free carboxyl radical and at least one free hydroxyl radical, or a mixture thereof, in the presence of an alkyl hypohalite, particularly the most easily handled tertiary alkyl hypohalite, for example, tertiary butyl hypochlorite.

When the reaction mechanism of the invention method is illustrated with model equations with respect to the principal reactions that are presumed to take place when the reactions are carried out under the foregoing treatment conditions using tertiary butyl hypochlorite as the assistant, it is as follows:

(1) In the case where 1,4-polybutadiene and acetic acid are partially reacted.

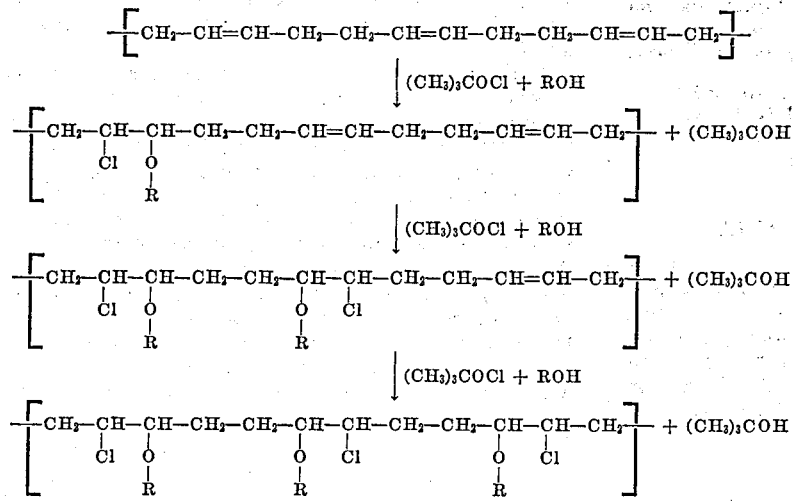

On the other hand, when a dibasic acid, say malonic acid has been used as the organic acid, the reaction is shown by the following equation:

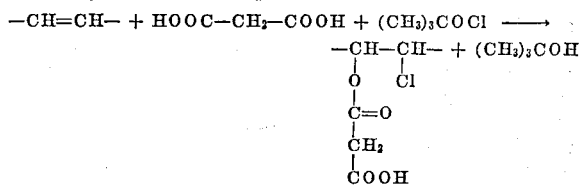

The invention method is generally carried out by reacting in an organic solvent under relatively mild conditions

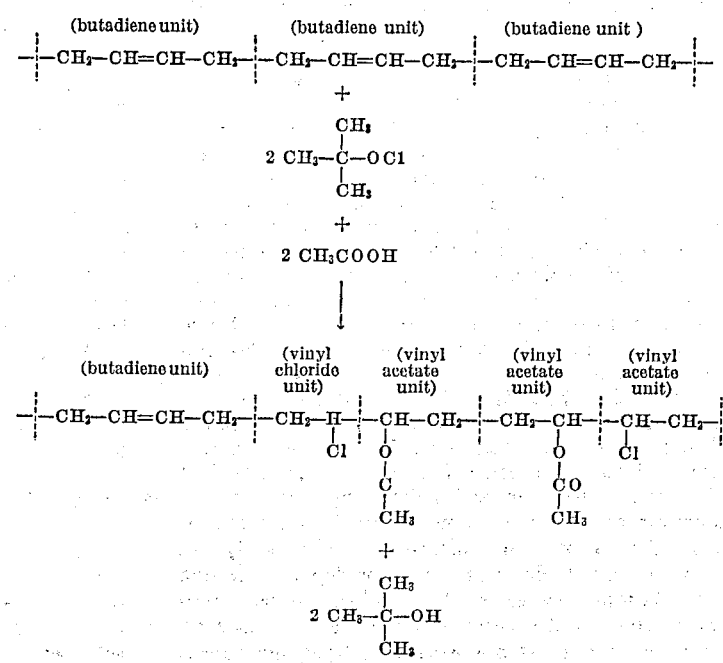

(2) In the case where 1,4-polyisoprene and acetic acid are reacted completely.
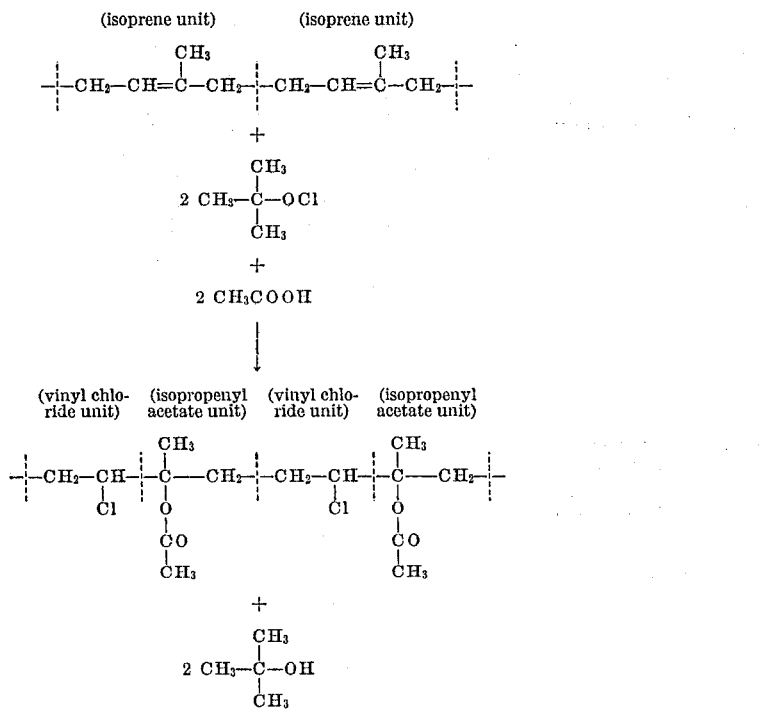
(3) In the case where, 1,4-polybutadiene and phenol are reacted partially.
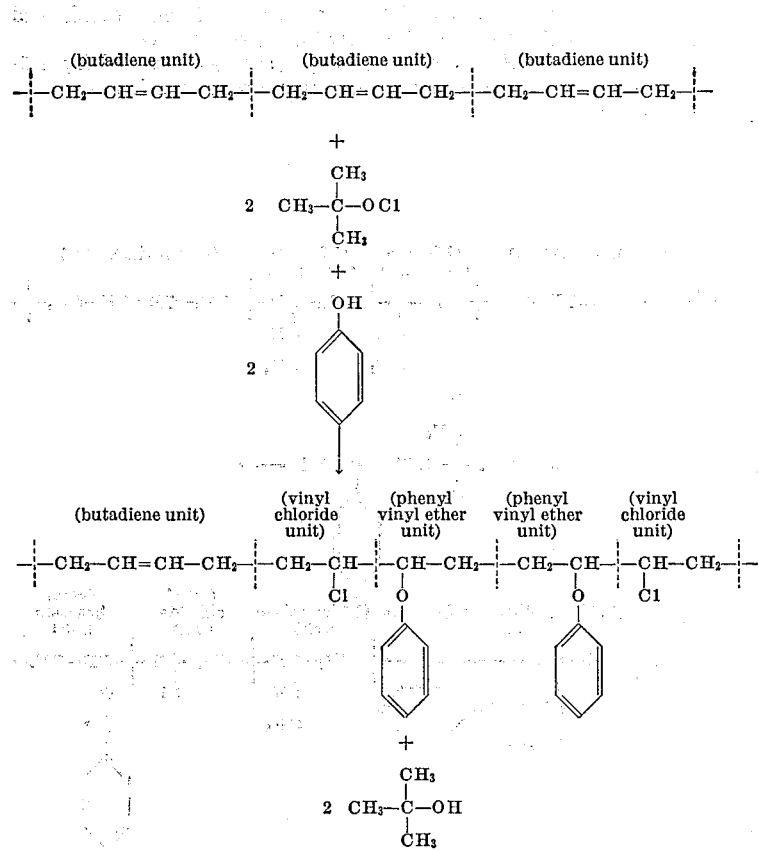

(4) In the case where butadiene-acrylonitrile copolymer and ethanol are reacted partially.

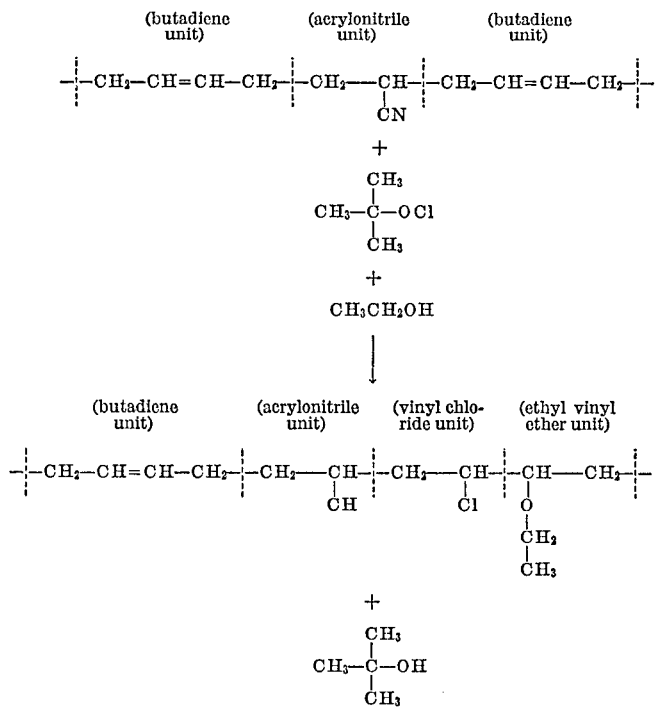

Besides those illustrated hereinabove, the polydiene substances include those which are formed by the so-called 1,2-bond or those formed by the 1,2- and 1,4-bonds. As examples thereof, reactions having the following equations are presumed to take place when the polydienes having the 1,2- and 1,4-bonds are reacted with benzoic acid in the presence of tertiary butyl hypochloride.

(5) In the case where polybutadienes containing 1,2- and 1,4-bond is reacted partially with benzoic acid.

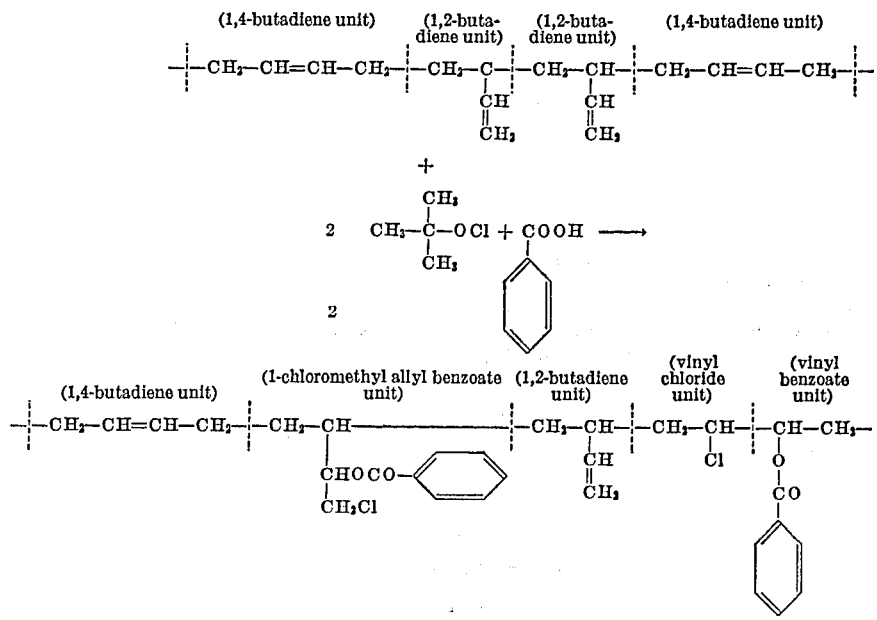

As can be seen from the foregoing equation, the resulting modified substance is not in exact agreement structurally with the three-component copolymer of butadiene, vinyl chloride and vinyl benzoate, but can be regarded as being a high molecular substance approximating in structure the terpolymer of these three components.

In practicing the invention method, the reaction temperature is not a critical controlling factor of the reaction of the invention, and hence the temperature can be varied over a broad range of, say, −40–120° C., or more. The desired objectives are however achieved usually with a temperature range between −10° and 80° C. The progress of the reaction is slow at low temperatures and is accelerated as the temperature becomes higher, similarly as with the usual chemical reactions. In the present invention, the reaction can be made to proceed smoothly by the addition, if necessary, of a small amount of a catalyst such as sulfuric acid, paratoluene sulfonic acid, naphthalene sulfonic acid and tetramethylammonium chloride.

The solvent used in the invention reaction must be one which can dissolve the unsaturated high molecular weight substance, but which does not react with the alkyl hypohalites and the organic acids, alcohols or phenols. In general, it is possibly to use, in accordance with the nature and molecular weight of the starting material, the following solvents, for example; the aliphatic solvents such as hexane, heptane and cyclohexane; the aromatic solvents such as benzene, nitrobenzene, halogenated benzenes, toluene and xylene; ethers such as diethyl ether and dioxane; esters such as ethyl acetate; ketones such as methyl ethyl ketone and cyclohexanone; chlorinated hydrocarbons such as ethyl chloride, methylene chloride, chloroform and carbon tetrachloride, carbon disulfide. The foregoing solvents may be used singly or as a mixture.

It is apparent from the hereinbefore described reaction mechanism of the present invention that as the organic acid all those having at least one free carboxyl radical in each molecule can be used. As examples, included are the aliphatic acids such as acetic acid, halogenated acetic acids, cyanoacetic acid, propionic acid, palmitic acid, stearic acid and maleic half esters as well as the substituent products thereof; the cyclic carboxylic acids such as benzoic acid, phenoxyacetic acid, trimellitic anhydride, naphthenic acid and phthalic half esters as well as the substituent products thereof; malonic acid, maleic acid, itaconic acid, citraconic acid, linolic acid dimer, malic acid, glycolic acid, salicylic acid, 12-hydroxystearic acid, acylated malic acid, oxalic acid, succinic acid, mercaptosuccinic acid, alkylthiosuccinic acids, acyl thiosuccinic acid, thiogylcolic acid disulfide, sebacic acid and azelaic acid. The phenols containing at least one free hydroxyl radical include phenol, halogenated phenols, alkylated phenols, nitrophenols, naphthol, catechol resorcinol and the like. On the other hand, the alcohols containing at least one free hydroxyl radical include methanol, ethanol, stearyl alcohol, ethylene chlorohydrin, ethylene cyanohydrin, benzyl alcohol, the glycols and the like.

In practicing this invention, a molecular ratio of organic acids containing one free carboxyl radical, alcohols and phenols containing one free hydroxyl radical or the mixtures thereof and alkyl hypohalite of about 1:1 is recommendable. In such a case, this ratio in which these organic acids, alcohols, phenols or the mixture thereof are added to alkyl hypohalite is however not a critical factor in this invention, because when former is added in excess, this excess portion remains merely unreacted, this likewise being the case when the latter has been added in excess.

Further, unless the reaction temperature is particularly high, the reaction according to the invention proceeds gently. Thus, the order of addition to the reaction medium of the organic acids containing one free carboxyl radical, alcohols and phenols containing one free hydroxyl radical or the alkyl hypohalite and the speed of addition do not become significant factors. Usually, either an order may be adopted in which the organic acid, alcohol, or phenol are added in advance to the medium containing the unsaturated high molecular weight substance, after which the alkyl hypohalite or a solution containing the same is added to the foregoing mixture; or a solution containing the alkyl hypohalite and the organic acid, alcohol or phenol may be gradually added to the medium containing the unsaturated high molecular weight substance.

In the case where organic acids containing at least two free carboxyl radicals, hydroxy organic acids containing at least one free carboxyl radical and at least one free hydroxyl radical, adcohols and phenols containing at least two free hydroxyl radicals or the mixtures thereof are used as the substituent radical introducing substance, the molecular ratio of above mentioned material and alkyl hypochlorite of lower than 1:1 is desirable in order to minimize the crosslinking reaction between the molecules of the unsaturated high molecular weight substances. It is also recommended in this case to follow the order of addition under which the organic acid, alcohol, or phenol are added to the medium containing the unsaturated high molecular weight substances, and next the alkyl hypohalite or a solution containing the same are gradually added to the foregoing mixture. The reaction will usually be completed in from several minutes to several hours, though no substantial discrepancies are observed even though the reaction is continued for an extended period of time.

After the reaction is completed, the product is isolable in customary manner; namely, the precipitation method by means of the addition of a non-solventing agent, the solvent removal method by means of distillation and the solvent removal method by means of freeze drying or steam distillation. Since the hypohalite used in the reaction is present after the reaction as its corresponding alcohol, for example, as tertiary butanol in the case of a tertiary butyl hypohalite, this can be recovered and reused, as required, by recycling it as the hypohalite.

According to the invention method, variations over a broad range are possible with respect to such as the class of the starting material unsaturated, high molecular weight substance, its molecular weight and the class and degree of substitution of the substituent radical to be introduced. Hence, the product can be optionally varied from those which are an elastomeric substance to those which are resinous. The high molecular weight substances which have been thus produced, can become in accordance with their properties valuable industrial materials or intermediates for the production of industrial materials: namely, as an elastomeric base, as a synthetic resin base, as compounding ingredient and processing aids for use with other elastomers and resins, as adhesives or compounding ingredient for adhesives, or as coating materials, fillers or compounding ingredients.

For illustrating the invention further, the following non-limitative examples are given.

Example 1

3.9 g. of acetic acid are dissolved in 40 g. of a benzene solution containing 12.5% by weight of cis-1,4-polybutadiene. To this mixed solution are added gradually at 20° C. 7.0 g. of tertiary butyl hypochlorite dissolved in 20 g. of benzene. When the mixed solution is allowed to stand for about 10 hours at room temperature, after which the reaction product is isolated by adding a large quantity of methanol, a white, elastic substance is obtained.

When the so obtained substance was submitted to elemental analysis, the results agreed well with that in which it was assumed that chlorine and an acetoxy radical were introduced to 49% of the double bonds of the polybutadiene. The presence of the acetoxy radical was also confirmed by the results of an infrared spectrum analysis. Again, it became clear that the steric structure of the remaining double bonds was of the cis type, there being no change by means of this treatment. From the fact that this product is soluble in methyl ethyl ketone, a non-solvent of the starting material cis-1,4-polybutadiene, and also it is insoluble in carbon disulfide and benzene, which both dissolve the starting material well, it is clear that this product is very different in nature from the starting material.

Example 2

When substantially the same procedures as in Example 1 were followed, except that 7.9 g. of benzoic acid were used instead of 3.9 g. of the acetic acid, 41% of the double bonds of the polybutadiene participated in the reaction, and a slightly elastic substance was obtained. Since this substance only swells in methyl ethyl ketone, carbon disulfide and benzene, it is clear that it is a substance differing greatly in nature from either that of the starting material or the product obtained in Example 1.

Example 3

Except that 150 cc. of diethyl ether containing 18.4 g. of stearic acid were used instead of the 3.9 g. of acetic acid and 0.05 g. of tetramethylammonium chloride were used as catalyst, the procedures followed were otherwise substantially as described in Example 1. As a result, 50% of the double bonds of the polybutadiene participated in the reaction, and an elastic and somewhat tacky substance was obtained. This substance is not soluble in either tetrahydrofuran, methyl ethyl ketone, carbon disulfide or benzene.

Example 4

To 40 g. of a benzene solution containing 12.5% by weight of a styrene-butadiene copolymer (23.5% styrene content) are dissolved 2.5 g. of benzyl alcohol. To this mixed solution is then added gradually at 20° C. 2.6 g. of tertiary butyl hypochlorite dissolved in 20 g. of benzene. This mixed solution is then allowed to stand for about 15 hours at room temperature, after which the reaction product is isolated by adding a large amount of methanol to obtain an elastic substance in which 32% of the double bonds of the styrene-butadiene copolymer had participated in the reaction. This substance which swells in tetrahydrofuran is insoluble in methyl ethyl ketone, but is soluble in carbon disulfide and benzene.

Example 5

The experiment was carried out substantially as described in Example 4, except that 6.5 g. of phenol were used instead of the benzyl alcohol, the amounts of the tertiary butyl hypochlorite were increased to 7.5 g. and 0.05 g. of paratoluene sulfonic acid were used as catalyst, whereby was obtained an elastic substance tinged with brown. This substance does not have any unreacted double bonds remaining and is neither soluble in tetrahydrofuran, methyl ethyl ketone, carbon disulfide or benzene.

Example 6

The experiment was conducted substantially as described in Example 1, except that 100 g. of a benzene solution containing 5% by weight of natural rubber were used, and the amounts of the acetic acid and the tertiary butyl hypochlorite were increased to 5.3 g. and 9.6 g., respectively. By eliminating the reaction solvent by means of steam distillation, an elastic product tinged with brown was obtained. This substance does not have any unreacted double bonds remaining and is soluble in either tetrahydrofuran, methyl ethyl ketone, carbon disulfide or benzene.

Example 7

Substantially the same procedures as described in Example 1 were followed except that 6.7 g. of acetic acid and 12 g. of tertiary butyl hypochlorite were used. The so obtained white resinous substance does not contain any unreacted double bonds and its infrared spectrum agrees substantially with that of the vinyl chloride-vinyl acetate copolymer.

Example 8

Substantially the same procedures as described in Example 6 were followed, except that 2.8 g. of methanol was used instead of the acetic acid. The so obtained substance is a gray powder having slight elasticity. In this case, about 15% of double bonds of the natural rubber remained unreacted.

Example 9

In 40 g. of a methyl ethyl ketone solution containing 12.5% by weight of an acrylonitrile-butadiene copolymer (33.5% acrylonitrile content) are dissolved 8.8 g. of benzoic acid. To this mixed solution is added gradually at 25° C. 7.8 g. of tertiary butyl hypochlorite dissolved in 20 g. of benzene. After holding the solution for 5 hours at 40° C., a large amount of methanol is added to isolate the reaction product, whereby is obtained a white resinous substance which does not have substantially any unsaturated bonds remaining. This substance, differing from the acrylonitrile-butadiene copolymer, is insoluble in methyl ethyl ketone as well as tetrahydrofuran, carbon disulfide and benzene.

Example 10

Substantially the same procedures as described in Example 9 were followed except that 2.3 g. of methanol were used instead of the benzoic acid, whereby was obtained a white powdered resin. This substance, which has about 15% of the double bonds of the acrylonitrile-butadiene copolymer remaining therein, is soluble in either tetrahydrofuran methyl ethyl ketone, carbon disulfide or benzene.

Example 11

25 g. of a diethyl ether solution containing 2.0 g. malonic acid were added in 170 g. of a benzene solution containing 6.0% by weight of cis-1,4-polybutadiene. To this mixed solution was added gradually at room temperature 1 g. of tertiary butyl hypochlorite dissolved in 20 g. of benzene and thoroughly mixed. By adding, after about 5 hours, the reaction mixture to a large quantity of methanol, rubberlike solid material can be isolated in estimate quantities.

It was confirmed by means of titration analysis, chlorine analysis and infrared spectrum analysis, respectively, that the so obtained carboxylated polybutadiene contained 4.3 units of free carboxyl radicals per 100 units of the double bonds and 4.1 units of chlorine per 100 units of the double bonds, and that the cis bond content did not change from that of the polybutadiene.

Examples 12–17

Various types of elastomers are treated under substantially the same conditions as in Example 11, except that it is so adjusted that the elastomer concentration in the final reaction mixture is 4% by weight, the final composition of the solvent consists of 80% by weight benzene and 20% by weight diethyl ether, and the weight ratio of the elastomer:malonic acid:tertiary butyl hypochlorite =10:2:0.5. The so obtained substances had the following free carboxyl radical contents.

| Example | Class of Elastomer | Carboxyl Radical Contents of the Reaction Products [1] |
|---|---|---|
| 12 | Natural rubber [2] | 3.1 |
| 13 | Styrene-butadiene copolymer [3] | 4.2 |
| 14 | Styrene-butadiene copolymer [4] | 10.7 |
| 15 | Acrylonitrile-butadiene copolymer [5] | 3.0 |
| 16 | Polychloroprene [6] | 3.2 |
| 17 | Ethylene-propylenediene copolymer [7] | [8] (1.7×10⁻⁴) |

[1] The number of carboxyl radicals introduced per 100 units of double bonds.
[2] Pale crepe.
[3] Styrene content, 23.5%.
[4] Styrene content, 85%.
[5] Acrylonitrile content, 33.5%.
[6] No difference in the trans bond content observable between the material and the carboxylated product.
[7] As the diene, dicyclopentadiene was contained in an amount of 5%.
[8] The number of units of carboxyl radicals found in one gram of the reaction product.

Examples 18–22

A polybutadiene having of a cis content of 98% and a trans content of 1.5% and 10 mols of malonic acid and 4 mols of tertiary butyl hypochlorite per 100 units of the double bonds of the polybutadiene are contacted for 1.5 hours at 50° C. in the various solvents indicated in the following table. The polybutadiene concentration in the reaction mixture is 7%. The free carboxyl radical content of the products obtained by removing the solvents by means of steam distillation were measured by the titration method with the following results.

| Example | Reaction Solvent | Carboxyl Radical Contents of the Reaction Products [1] |
|---|---|---|
| 18 | Diethyl ether | 3.2 |
| 19 | Benzene (80 wt. percent) plus diethyl ether (20 wt. percent). | 3.3 |
| 20 | Ethylene chloride (80 wt. percent) plus diethyl ether (20 wt. percent). | 3.5 |
| 21 | Carbon disulfide (80 wt. percent) plus diethyl ether (20 wt. percent). | 3.3 |
| 22 | Carbon tetrachloride (80 wt. percent) plus diethyl ether (20 wt. percent). | 3.7 |

[1] The number of carboxyl radicals introduced per 100 units of double bonds.

Example 23

The reaction was carried out as described in Examples 18–22 except that as the starting material was used an acrylonitrile-butadiene copolymer containing 33.5% acrylonitrile and as the solvent was used methyl ethyl ketone, with the consequence that 3.6 units of free carboxyl radicals were introduced per 100 units of the double bonds.

Examples 24–29

A 98% cis content polybutadiene, as a 4 wt. percent ether solution, was contacted for 3 hours at 20° C. with various dibasic acids and 3.5 mols of tertiary butyl hypochlorite per 100 units of the double bonds, following which methanol is added. The free carboxyl radical contents of the isolated carboxylated products were as follows:

| Example | Dibasic Acid Class | Amount added [1] | Carboxyl Radical Contents of Products [2] |
|---|---|---|---|
| 24 | Malonic acid | 10 | 3.4 |
| 25 | Maleic acid | 10 | 3.2 |
| 26 | Succinic acid | [3] | 1.0 |
| 27 | Sebacic acid | [4] | 1.8 |
| 28 | Malic acid | [4] | 1.5 |
| 29 | Dimeric acid [4] | 10 | 1.5 |

[1] Mols added per 100 units of double bonds.
[2] The number of carboxy radicals introduced per 100 units of double bonds.
[3] An excess amount suspended in the solvent.
[4] Dimerized product of linolic acid.

Example 30

Substantially the same procedures as described in Example 11 were followed, except that 2.8 g. of glycolic acid was used instead of the malonic acid. It was confirmed by means of chlorine analysis and infrared spectrum analysis, respectively, that the so obtained elastic substance contained 5.1 units of chlorine per 100 units of the double bonds of the cis-1,4-polybutadiene, and contained ester bonds and free hydroxyl radicals.

Example 31

Substantially the same procedures as described in Example 30 were followed, except that 5.2 g. salicylic acid was used instead of the glycolic acid and reaction temperature raised at 50° C., whereby was obtained an elastic substance in which 6.9% of the double bonds of the cis-1,4-polybutadiene had participated in the reaction.

Example 32

Except that 2.4 g. of ethylene glycol was used instead of the salicylic acid and 0.05 g. of paratoluene sulfonic acid was used as catalyst, the procedures followed were otherwise substantially as described in Example 31. It was confirmed by means of chlorine analysis and infrared spectrum analysis, respectively, that the so obtained elastic substance contained 2.9 units of chlorine per 100 units of the double bonds of the cis-1,4-polybutadiene, and contained ether bonds and free hydroxyl radicals.

We claim:

1. A method of modifying unsaturated, high molecular weight substances which comprises effecting the reaction between at least one substituent radical introducing substance selected from the group consisting of the organic acids containing at least one free carboxyl radical, the alcohols and phenols containing at least one free hydroxyl radical and the hydroxy acids containing at least one free carboxyl radical and at least one free hydroxyl radical, an unsaturated, high molecular weight substance containing a diene as one of its constituents, and an alkyl hypohalite, in a solvent capable of dissolving said unsaturated, high molecular weight substance and non-reactive with respect to said substituent radical introducing substance and alkyl hypohalite, at a temperature ranging between −40° C. and 120° C.

2. The method of claim 1 wherein said unsaturated, high molecular weight substance is a member selected from the group consisting of natural rubber, polybutadiene, polyisoprene, a butadiene-styrene copolymer, a butadiene-acrylonitrile copolymer, an ethylene-propylenediene copolymer, an isobutylene-diene copolymer and polychloroprene.

3. The method of claim 1 wherein said substituent radical introducing substance is a member selected from the group consisting of acetic, stearic, benzoic, malonic, maleic, itaconic, citraconic, succinic, sebacic, malic, glycolic, salicyclic, 12 hydroxy stearic, and dimeric acids, methyl and benzyl alcohols, and phenol.

4. The method of claim 1 wherein said alkyl hypohalite is a tertiary butyl hypohalite.

5. The method of claim 1 wherein said solvent is a member selected from the group consisting of benzene, diethyl ether, methyl ethyl ketone, ethylene chloride, carbon disulfide, and carbon tetrachloride.

6. A method of modifying unsaturated, high molecular weight substances which comprises effecting the reaction between at least one substituent radical introducing substance selected from the group consisting of the organic acids containing at least one free carboxyl radical the alcohols and phenols containing at least one hydroxyl radical and the hydroxy acids containing at least one free carboxyl radical and at least one free hydroxyl radical, an unsaturated, high molecular weight substance containing a diene as one of its constituents, and an alkyl hypohalite in a nearly equimolar amount as said substituent radical introducing substance, in the presence of a catalyst, in a solvent capable of dissolving said unsaturated, high molecular weight substance and non-reactive with respect to said substituent radical introducing substance and alkyl hypohalite, at a temperature ranging between −40° and 120° C.

7. The method of claim 6 wherein said catalyst is a member selected from the group consisting of sulfuric, paratoluene sulfonic, naphthalene sulfonic acids and tetramethylammonium chloride.

8. A composition obtained by effecting the reaction between an unsaturated, high molecular weight substance containing a diene as one of its constituents and at least one substituent radical introducing substance selected from the group consisting of the organic acids containing at least one free carboxyl radical, the alcohols and phenols containing at least one free hydroxyl radical and the hydroxy acids containing at least one free carboxyl radical and at least one free hydroxyl radical in the presence of an alkyl hypohalite in a solvent capable of dissolving said unsaturated, high molecular weight substance and non-reactive with respect to said substituent radical introducing substance and alkyl hypohalite, at a temperature ranging between $-40°$ C. and $120°$ C.

9. The composition as claimed in claim 8, in which said unsaturated, high molecular weight substance is a member selected from the group consisting of natural rubber, polybutadiene, polyisoprene, a butadiene-styrene copolymer, a butadiene-acrylonitrile copolymer, an ethylene-propylene-diene copolymer, an isobutylene-diene copolymer and polychloroprene.

10. The composition as claimed in claim 8 in which said substituent radical introducing substance is a member selected from the group consisting of acetic, stearic, benzoic, malonic, maleic, itaconic, citraconic, succinic, sebacic, malic, glycolic, salicylic, 12-hydroxy stearic and dimeric acids, methyl and benzyl alcohols, and phenol.

11. The composition as claimed in claim 8 in which said alkyl hypohalite is a tertiary butyl hypohalite.

12. The composition as claimed in claim 8 in which said solvent is a member selected from the group consisting of benzene, diethyl ether, methyl ethyl ketone, ethylene chloride, carbon disulfide, and carbon tetrachloride.

13. A composition obtained by effecting the reaction between an unsaturated, high molecular weight substance containing a diene as one of its constituents and at least one substituent radical introducing substance selected from the group consisting of the organic acids containing at least one free carboxyl radical the alcohols and phenols containing at least one hydroxyl radical and the hydroxy acids containing at least one free carboxyl radical and at least one free hydroxyl radical, in the presence of an alkyl hypohalite in a nearly equimolar amount as said substituent radical introducing substance and a catalyst, in a solvent capable of dissolving said unsaturated, high molecular weight substance and non-reactive with respect to said substituent radical introducing substance and alkyl hypohalite, at a temperature ranging between $-40°$ C. and $120°$ C.

14. The composition as claimed in claim 13 in which said catalyst is a member selected from the group consisting of sulfuric, paratoluene sulfonic, naphthalene sulfonic acids and tetramethylammonium chloride.

References Cited

UNITED STATES PATENTS

| | | | |
|---|---|---|---|
| 2,276,956 | 3/1942 | Gleason et al. | 252—54 |
| 3,328,362 | 6/1967 | Roberts et al. | 260—79.3 |
| 3,357,965 | 12/1967 | Click | 260—94.7 |
| 2,054,814 | 9/1936 | Harford | 260—469 |
| 2,511,870 | 6/1950 | Oroshnik | 260—497 |
| 2,947,766 | 8/1960 | Riener | 260—405 |
| 3,255,133 | 6/1966 | Nevin | 260—23 |
| 3,317,479 | 5/1967 | Noshay et al. | 260—77.5 |

DONALD E. CZAJA, *Primary Examiner.*

R. A. WHITE, *Assistant Examiner.*